Dec. 24, 1946.  E. C. ALBRECHT ET AL  2,413,131
SELECTIVE ACTUATING AND INDICATING MECHANISM
Filed Nov. 28, 1940  8 Sheets-Sheet 1

Inventors:
Edmund C. Albrecht,
George Cerny,
by John D. Rippey,
their Attorney.

Dec. 24, 1946.    E. C. ALBRECHT ET AL    2,413,131
SELECTIVE ACTUATING AND INDICATING MECHANISM
Filed Nov. 28, 1940    8 Sheets-Sheet 4

Inventors:
Edmund C. Albrecht,
George Cerny,
by John D. Rippey
their Attorney.

Dec. 24, 1946.    E. C. ALBRECHT ET AL    2,413,131
SELECTIVE ACTUATING AND INDICATING MECHANISM
Filed Nov. 28, 1940    8 Sheets-Sheet 5

INVENTORS:
EDMUND C. ALBRECHT,
GEORGE CERNY,
BY John H. Cassidy
THEIR ATTORNEY.

Dec. 24, 1946.                E. C. ALBRECHT ET AL                2,413,131
                    SELECTIVE ACTUATING AND INDICATING MECHANISM
                    Filed Nov. 28, 1940                8 Sheets-Sheet 6

Inventors:
Edmund C. Albrecht,
George Cerny,
by John D. Rippey
their Attorney.

Dec. 24, 1946.  E. C. ALBRECHT ET AL  2,413,131
SELECTIVE ACTUATING AND INDICATING MECHANISM
Filed Nov. 28, 1940  8 Sheets-Sheet 7

Inventors:
Edmund C. Albrecht,
George Cerny,
By John D. Rippey,
their Attorney.

Patented Dec. 24, 1946

2,413,131

UNITED STATES PATENT OFFICE 2,413,131

SELECTIVE ACTUATING AND INDICATING MECHANISM

Edmund C. Albrecht, Richmond Heights, and George Cerny, St. Louis, Mo., assignors to Pauly Jail Building Company, St. Louis, Mo., a corporation of Missouri Application November 28, 1940, Serial No. 367,494

10 Claims. (Cl. 189—7)

This invention relates to selective actuating and indicating mechanism; and it has special reference to a mechanism for selectively operating one or more of a series of parts and for indicating when any one or more of said parts has become inoperative.

The invention is applicable to various uses. For purpose of illustration, I have selected an embodiment wherein one or more of a series of sliding doors or the like may be selectively moved from one position to another or selectively opened and closed. These sliding doors may typify any parts capable of selective operation by the present invention, irrespective of what the function of such parts may be; and the indicating mechanism may indicate when any of the doors have become or have been rendered inoperative by the unauthorized action of any person, or otherwise.

An object of the invention is to provide a selecting and actuating mechanism for selectively opening any or all of a series of sliding doors and subsequently closing the same, and also to provide in association and cooperative relationship therewith mechanism for indicating the fact when any one or more of the doors has become or been rendered inoperative or held from closing after said door or doors have been opened.

Another object of the invention is to provide actuating and indicating mechanism for selectively unlocking and moving selected doors from closed to open positions and for moving said doors from their open positions to closed positions, in combination with means for automatically releasing any of said doors from said mechanism when such doors are blocked against further movement towards closed positions, automatic means for locking the blocked doors in the positions in which they are blocked, and mechanism operating automatically and as an incident to the blocking thereof and the movement of other doors to closed positions for indicating which doors were blocked and prevented from closing.

Other objects will appear from the following description, reference being made to the annexed drawings, in which—

The invention is shown cooperatively associated with a longitudinal series or tier of sliding doors for opening and closing door openings 1 constituting entrances and exits for a longitudinal series or tier of cells or rooms. The walls 2 having the door openings 1 are shown as of the rigid barred type, although the type of said walls or their form of construction may be varied as desired. The door for each opening 1 comprises a strong metallic frame 3 having the approximate dimensions of the door opening, and a series of vertical bars 4 and cross-bars 5, all of which are relatively rigid and immovable within the frame 3. Each cell space or room is confined between a pair of end walls or grids 6, and the rear wall of each cell space or room may be of any chosen construction.

Figure 9:
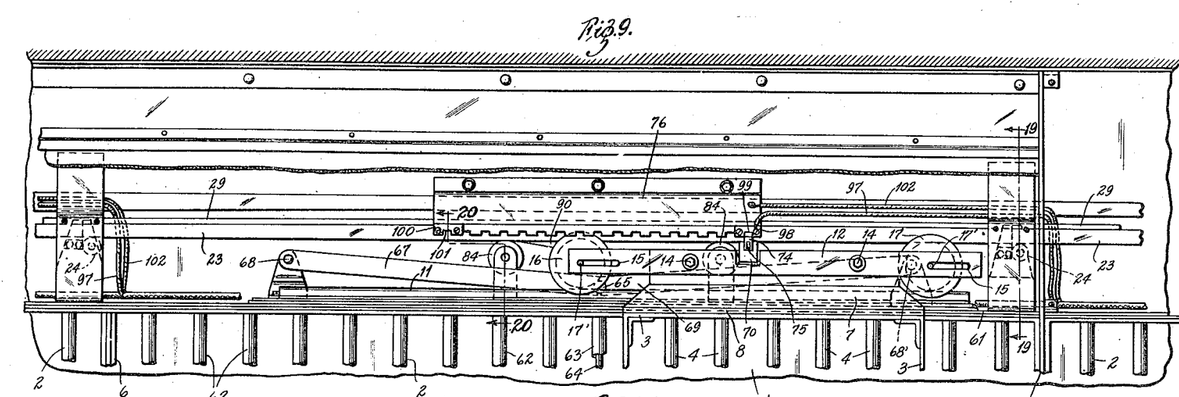
Fig. 9 is a front elevation of the selecting and actuating mechanism above the second door of the series when said door is closed.
Figure 10:
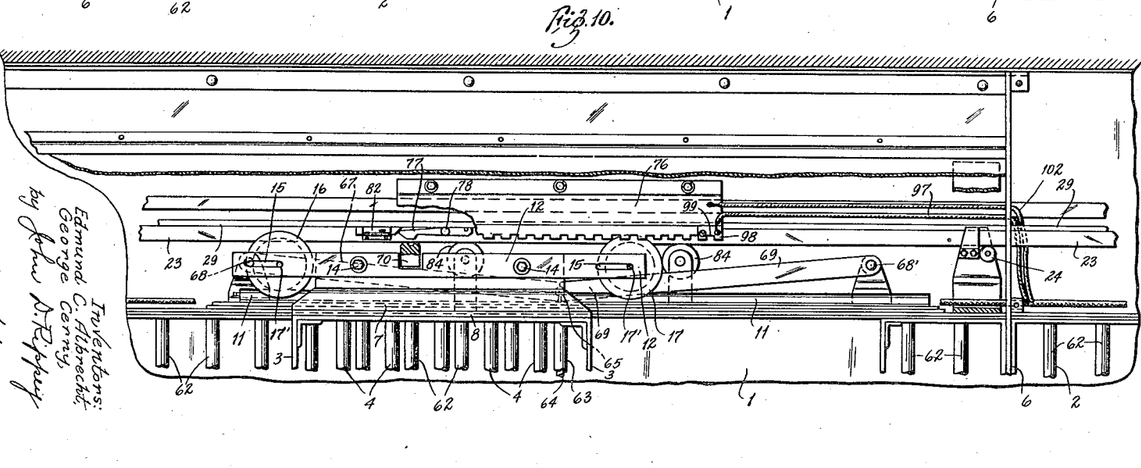
Fig. 10 is a front elevation of the selecting and actuating mechanism above the second door of the series, showing the positions of the parts when said door is open.
Figure 15:
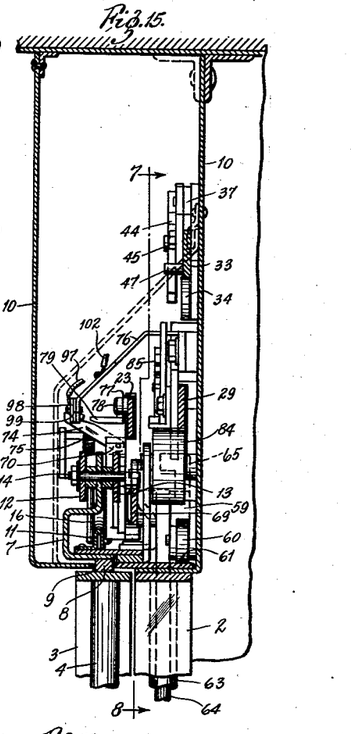
Fig. 15 is a vertical cross-sectional view of the selecting and actuating mechanism on the line 15—15 of Fig. 5.
Figures 16, 17:
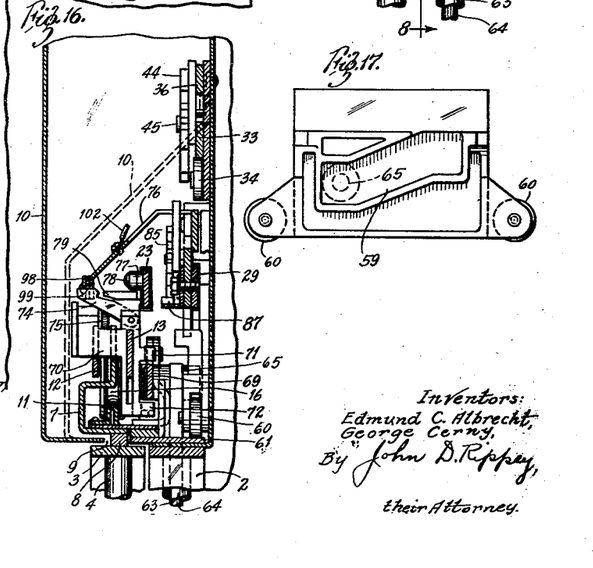
Fig. 16 is a sectional view of said mechanism approximately on the line 16—16 of Fig. 5.
Fig. 17 is a side elevation of the cam member controlling vertical operation of the locking bar and latch for the respective doors.

A truck bar 7 is rigidly attached to the upper end of each sliding door by a spacer bar 8. The spacer bar 8 extends through a slot 9 in the lower side of a housing 10 (Fig. 15). The truck bar 7 extends below and upwardly at one side of a stationary rail 11. Two parallel truck bars 12 and 13 are rigidly attached to the truck bar 7 by bolts 14 and have parallel slots 15 (Fig. 9) in their opposite end portions. Rollers 16 and 17 are mounted between the end portions of the bars 12 and 13 and have axial trunnions 17' projecting into the slots 15 and thereby supporting the respective doors. The rollers are mounted on the rails 11 to support the doors during their movements from closed position to open position, and vice versa. The trunnions 17' projecting into the slots 15 provide a type of anti-friction device to minimize friction and facilitate initiation of and continued movement of the carriage structure comprising the truck bars 7, 12 and 13, which structure is supported by the rollers 16 and 17.

Figure 13:
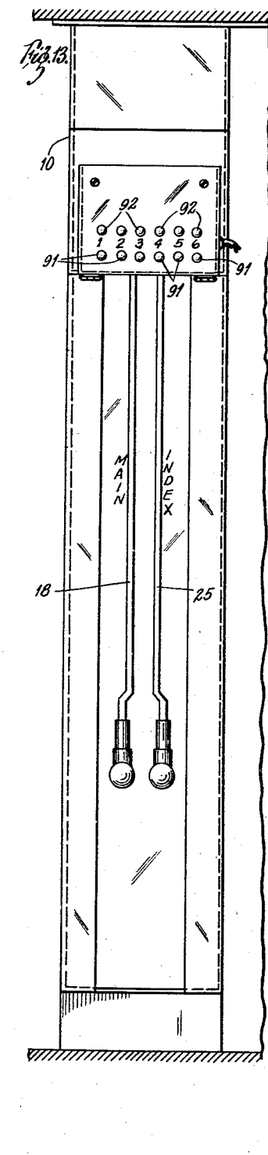
Fig. 13 is an elevation of the selecting and actuating and indicating mechanisms for the series of doors.

A lever 18 is mounted for swinging movements on a pivot 19 (Figs. 7 and 13) and has its upper end connected by a link 20 with an arm 21. The arm 21 is attached by a connection 22 to a long bar 23 mounted for longitudinal movements on rollers 24. The bar 23 extends horizontally above all of the doors in the series and by these connections is movable longitudinally by operation of the lever 18.

Figure 7:
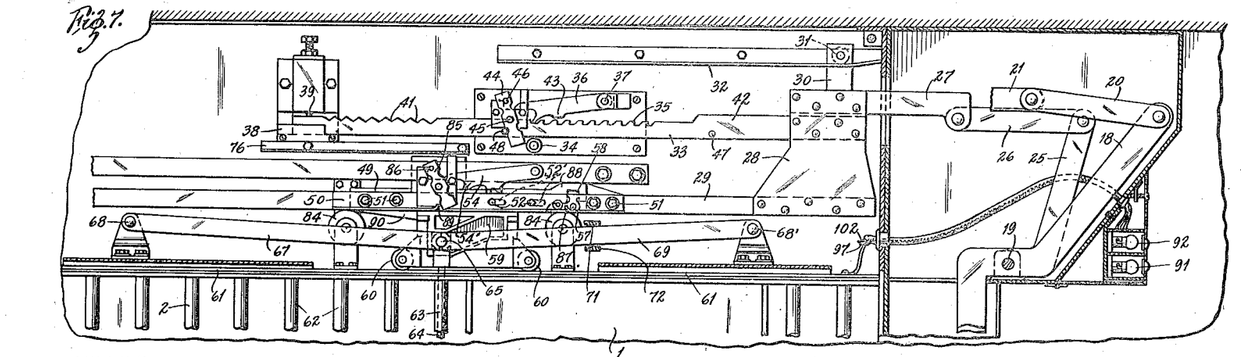
Fig. 7 is a view along the line 7—8 of Fig. 15 showing the parts of the locking mechanism in the positions they occupy when the door is fully locked, the parts of the selecting and operating mechanism being shown in the same positions as in Fig. 5.
Figure 14:
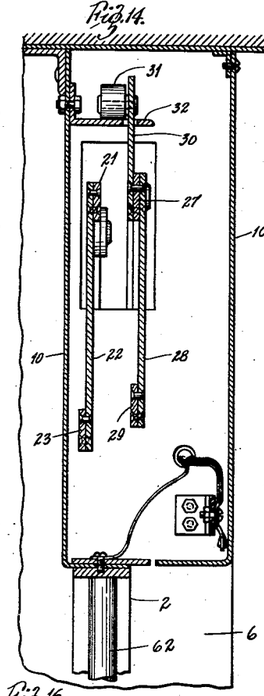
Fig. 14 is a vertical sectional view on the line 14—14 of Fig. 5.

A selecting or indexing lever 25 is mounted for swinging movements on the pivot 19. The upper end of the lever 25 is connected by a link 26 with an arm 27 attached by a part 28 to a bar 29 extending horizontally above all the doors of the series. The bar 29 is suspended for longitudinal movements by hangers 30 having rollers 31 operating on rigid rails 32, one of which is shown in the drawings (Figs. 7 and 14). Any number of hangers 30, rollers 31, and rails 32 are provided that may be needed to support the bar 29 for horizontal longitudinal movements.

Figures 1, 2, 3, 4:
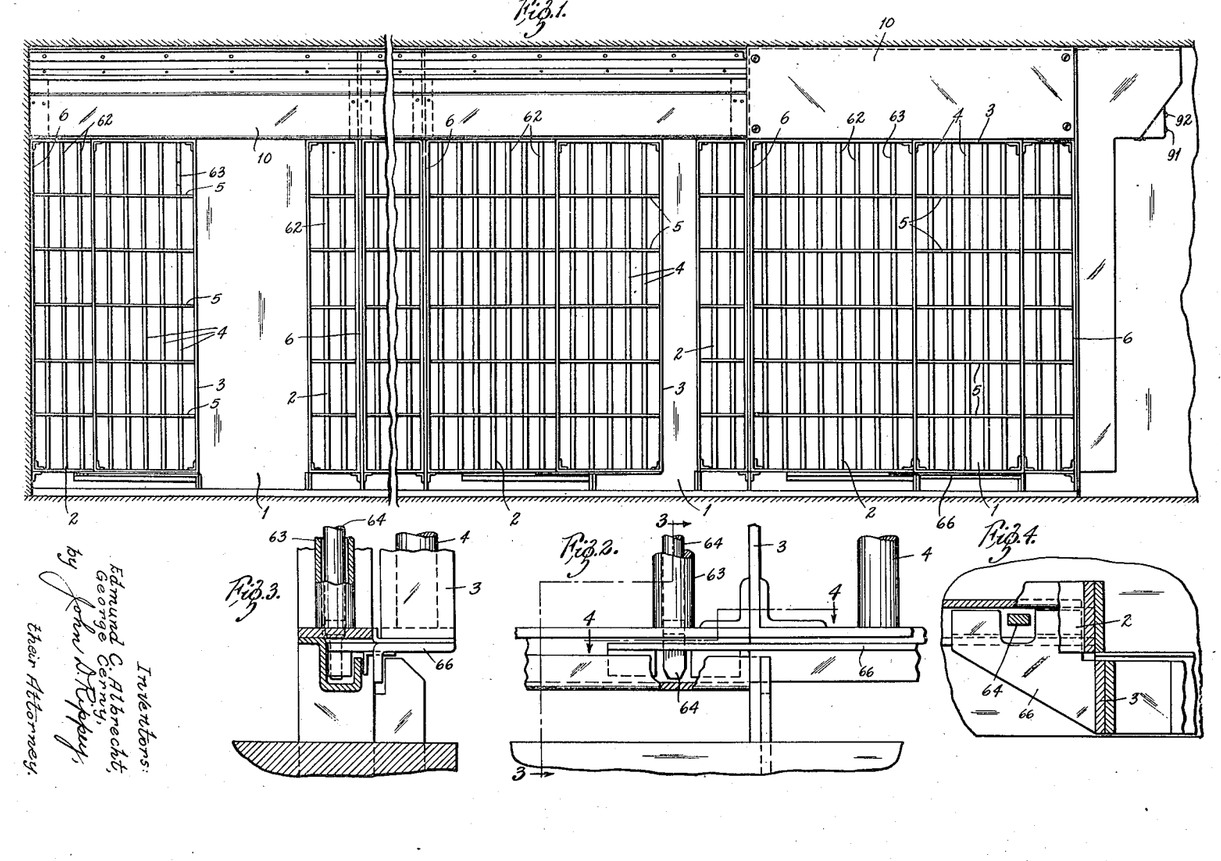
Fig. 1 is a front elevation of a series of sliding doors showing one in closed position and others in partially open positions.
Fig. 2 is a detail view with a part broken away showing a lock device by which the respective doors are locked in their closed positions.
Fig. 3 is a cross-sectional view approximately on the line 3—3 of Fig. 2.
Fig. 4 is a horizontal sectional view on the line 4—4 of Fig. 2.
Figure 5:
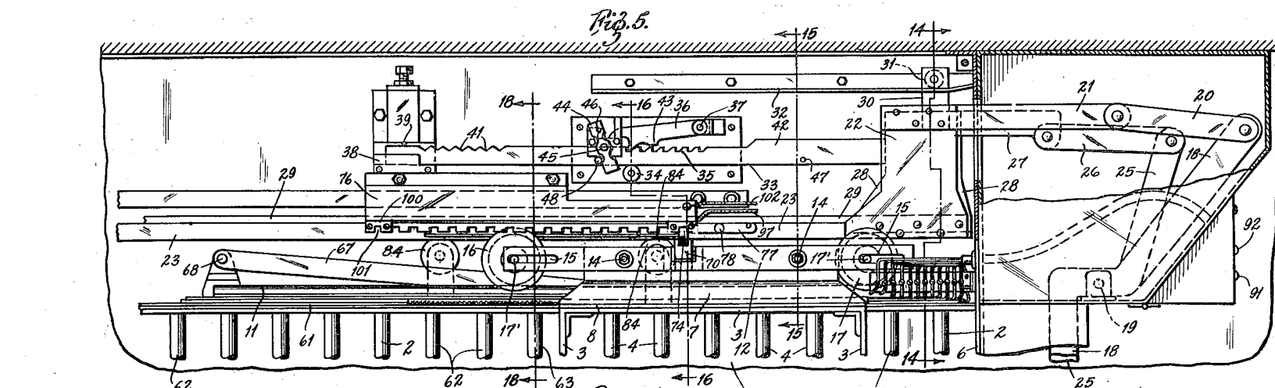
Fig. 5 is a front elevation of a part of the invention showing the selecting, operating and indicating mechanism for the sliding doors and also showing the locking mechanism for one door, all parts being shown in the position they occupy before operation of the selecting, operating and indicating mechanism and when said door is locked in closed position.

A bar 33 is attached to the part 28 for longitudinal movements on a roller 34 and is provided in its upper edge with a series of ratchet teeth 35 engaged by a pawl 36 mounted on a stationary pivot 37 (Figs. 5 and 7). The arrangement is such that the bar 33 may be moved longitudinally toward the left as shown in Figs. 5 and 7 without restraint by the pawl 36 since the teeth 35 will escape and move under and beyond the pawl. Also, the arrangement is such that, unless the pawl 36 is disengaged from the teeth 35, the bar 33 cannot be moved toward the right until after the pawl 36 has been disengaged from the teeth 35. The bar 33 is also supported and moved through a guide 38 in which a detent latch 39 is mounted and actuated downwardly by a spring 40 to engage in V-shaped notches 41 in the upper edge of the bar 33. In the inward position of the bar 33, a cam portion 42 on said bar 33 engages under a projection 43 on the pawl 36 and thereby supports said pawl in a position in which it cannot engage the teeth 35 during the first part of the return movement of said bar 33 to its initial position. A support 44 is mounted on a stationary pivot 45 for oscillating movements, and has on its upper end a pin 46 adapted to engage under the pawl 36 in the raised position of said pawl (Fig. 8), and thereby support said pawl in a position in which it cannot engage the teeth 35 during return movement of the bar 33 to its initial or starting position. A pin 47 attached to the bar 33 will engage the lower end portion of the support 44 and turn the same about its pivot 45 to engage the pin 46 under the pawl 36 to support the latter in its raised position in order to permit return movement of the bar 33 to its starting position. The pin 47 engages and operates the support 44 only after the pawl 36 has been disengaged from the teeth 35 by the cam 42. Another pin 48 on the bar 33 engages and operates the support 44 during final movements of said bar 33 toward its initial or starting position shown in Fig. 7, thereby operating the support 44 to disengage the pin 46 from the pawl 36, permitting the latter to swing downwardly into engagement with the ratchet teeth 35, as shown. The bar 33 and the pawl 36 function as a full stroke device preventing return of the lever 25 to its starting or unoperated position after movement thereof from said position has been initiated and until after full stroke or complete movement thereof from said position has been completed. After completion of full stroke of the lever 25, the projection 43 is seated on the cam 42 and the pin 46 is under the free end of the pawl 36. During return movement of the lever 25 and the bar 33, the pin 46 supports the pawl 36 out of engagement with the teeth 35 until the pin 48 moves the support 44 to the position shown in Fig. 5, thereby disengaging the pin 46 from the pawl 36 and leaving said pawl 36 free to drop to position in which it engages the teeth 35.

There is a single assembly comprising the bar 33 and the elements cooperating therewith, and they are located at the end of the series of doors at which the lever 25 is mounted. The functioning and cooperative action of the bar 33 and the associated elements already mentioned are described hereinafter in the description of the operation of the invention. The bar 29 extends over the entire series of doors and constitutes a part of the selecting mechanism by which operation of the index lever 25 will index any selected doors in the series of doors, or all of the doors together. For each door of the series, the bar 29 supports a plate 49 for limited longitudinal sliding movements. A bar 50 is rigidly attached to the bar 29 by bolts 51, being separated from said bar 29 by spacers. The selecting plate 49 for each door is mounted for limited longitudinal sliding movements between the bars 29 and 50 by pins 52 attached to said bars 29 and 50 and extending through slots 52' in the plates 49. Each plate 49 is formed with a universal notch 55 for engagement with a complementary pawl 54 when all of the doors of the series are closed. When all of the doors of the series are to be opened at one operation, the lever 25 is moved a short distance from the position it occupies when all of the doors of the series are closed. This slight movement of the lever 25 imparts a slight longitudinal movements to the bar 29, thereby enabling all of the pawls 54 to become engaged in notches 53. The pawls 54 are of the escapement type. Each pawl 54 has a ratchet tooth 54' arranged to seat in the notches 55 or 53 and thereby positively hold the plates 49 and the attached parts from return movement toward the right (Fig. 7). The plates 49 and attached parts can be moved inwardly or toward the left by escapement action or sliding movement of the teeth 54' from the notches 55 and 53 and along the plates 49. When the pawls 54 are engaged in the notches 53 preparatory for an operation to open all of the doors, the pawl 36 is supported on the upper edge of one of the teeth 35. Then the index lever 25 is moved a short distance in the opposite direction, which is to say said lever 25 is moved a slight distance toward its initial position, until the pawl 36 descends into engagement with the next adjacent tooth toward the left (Fig. 7). This slight movement of the lever 25 toward its starting position also moves the bar 29 a slight distance toward its starting position. Because of the fact that the pawls 54 are engaged in the notches 53, the plates 49 are held by said pawls and prevented from such return movement with the bar 29. Thus, the bar 29 is moved relative to all of the plates 49 the distance permitted by the pin and slot connections 52—52'. Because of the fact that the plates 49 are positively held by the pawls 54, which are engaged in the notches 53, the bar 29 is stopped after the limited movement permitted by the pin and slot connections 52—52', thereby cooperating with the pawl 36 and the tooth 35 to prevent further movement of the index lever 25 toward its initial or starting position.

An angular lever 56 is supported by a pivot 57 between the bars 29 and 50 and has one arm engaging in a notch 58 in the plate 49. When the bar 29 is moved toward its starting position and all of the plates 49 are held by the pawls 54 as described, all of the levers 56 are moved from the position shown in Fig. 7 to the position shown in Fig. 8, in which latter position the lower arms of said levers are extended downwardly beyond the lower edges of the parts 29 and 50. Frictional engagement of the plates 49 with the bars 29 and 50 and with the supporting pins 52 is sufficient to hold said plates 49 in the positions in which the levers 56 are extended downwardly beyond the lower edges of the bars 29 and 50 during movement of said parts toward the left until the lower ends of the levers 56 engage the cams 59. After the lower ends of the levers 56 engage the cams 59, said levers cannot again be raised out of engagement with said cams until the lever 25 is moved far enough toward its starting or initial position to move the levers 56 beyond and out of engagement with the cams 59 and leave said levers free to be raised as hereinafter described.

After the levers 56 have been moved to positions in which they extend downwardly below the parts 29 and 50, the index lever 25 is again moved in a direction away from its initial or starting position, thereby moving the bar 29 longitudinally above all of the doors. By this longitudinal movement of the bar 29, each of the levers 56 is engaged with a corresponding cam 59. The cams 59 are supported by rollers 60 operating along a frame part 61 so that said cams may be moved longitudinally in one direction by the levers 56.

Figures 8, 8A:
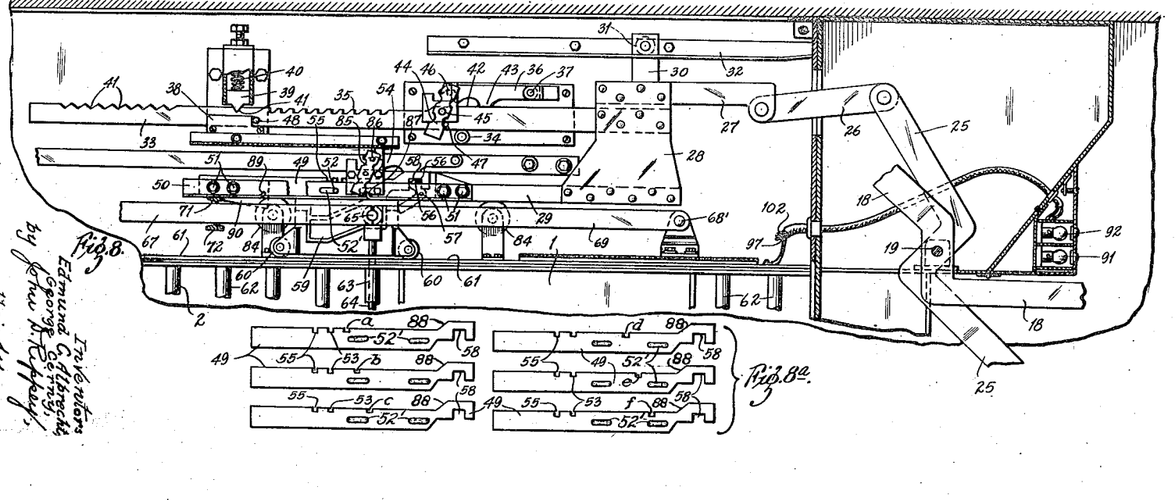
Fig. 8 is a view along the line 7—8 of Fig. 15, showing the parts of Fig. 7 in the positions they occupy when the doors are open as in Fig. 6.
Fig. 8a illustrates a series of the plates 49 for selectively opening any one or any number of doors in the series.

The plates 49 for the respective doors are formed with selecting notches $a$, $b$, $c$, $d$, $e$, and $f$. These notches are formed at different distances from the respective universal notches 53 which are equal distances from the notches 55 and in which all of the pawls 54 engage when all of the doors are to be opened at the same time. When only that door corresponding to the plate 49 having the notch $a$ therein is to be opened, the adjacent pawl 54 will engage in said notch $a$ while the remaining pawls 54 are supported out of the notches in the plates 49 by the unnotched portions of the upper edges of the plates 49 between the notches 53 and the notches $b$, $c$, $d$, $e$, and $f$. Therefore, a slight movement of the lever 25 towards its starting position will move only that plate 49 having the notch $a$ therein and will thereby move the connected lever 56 to downwardly extended position for engagement with the adjacent cam 59. The pawl 36 cooperating with the teeth 35 on the full stroke bar 33 constitutes a stop device to limit extent of movement of the lever 25 toward its starting position at this time. If any other door is to be opened at the same time, the lever 25 is then again moved in a direction away from its starting position far enough to permit the pawl 54 of the selected door to engage in the notch $b$, $c$, $d$, $e$, or $f$, corresponding to the selected door. Then the lever 25 is again moved a short distance toward its starting position, thereby causing the engaged plate 49 to extend the connected lever 56 downwardly for engagement with the cam 59 of the selected door. Again, the pawl 36 engaging one of the teeth 35 on the bar 33 constitutes a stop to limit extent of movement of the lever 25 toward its starting position. This operation is repeated successively and progressively for each door of the series selected to be opened, leaving the pawls 54 corresponding to the doors that are not to be opened riding upon the unnotched portions of the upper edges of the adjacent plates 49 during movement of the plates 49 corresponding to the selected doors. After the levers 56 corresponding to the several doors selected for opening have been extended downwardly in this manner, the lever 25 is moved as far as possible from its starting position. At this time the pawl pin 46 is in position to support the pawl 36 out of engagement with the teeth 35 during return movement of the lever 25 and bar 33 to their starting positions. This movement of the lever 25 moves the bar 29 and the parts supported thereby including the plates 49 and levers 56 toward the left (Figs. 7 and 8). Leftward movement of the bar 29 engages the levers 56 which had been extended downwardly as described with the corresponding cams 59, thereby moving said cams toward the left. The remaining levers 56 that had not been extended downwardly as described pass above and do not move the adjacent cams 59. By operating the lever 25 and its associated devices in this way, any one or more of the doors may be selected for movements to open positions and may be unlocked and then opened as hereinafter described.

The front of each cell space is formed by a vertical series of bars 62 and a special tubular bar 63. A lock bolt 64 is mounted for vertical sliding movements in each of the tubular bars 63. These vertical tubular bars are preferably located adjacent to one of the side members of the door frames. The upper end of each lock bolt 64 is connected with a pin 65 engaging in the cam 59. Therefore, when all of the cams 59 are moved in one direction from their starting positions by the levers 56, all of the lock bars 64 will be moved vertically and disengaged from the lower ends of the respective door parts 66. The parts 66 are rigidly secured to the lower ends of the door bars 4 and constitute rigid parts of the respective doors. When the lock bolts 64 are moved downwardly, they are extended through holes in the door parts 66, thereby rigidly locking and holding all of the doors closed. However, when the lock bolts 64 are moved upwardly by movement of the cams 59 by the levers 56 as described, all of said lock bolts 64 are disengaged from the door parts 66, leaving the doors free to be opened by operation of the lever 18 and the mechanism controlled thereby.

Each of the pins 65 is rigidly attached to one end of an arm 67. The opposite ends of the arms 67 are mounted on pivots 68. Each pin 65 is also pivotally engaged with the adjacent end of an arm 69 complementary to the arm 67, the opposite ends of the arms 69 being supported on pivots 68'. As a consequence, movement of the pins 65 by the cams 59 imparts corresponding movements to the connected ends of the arms 67 and 69. In Fig. 7, these parts are shown in positions they occupy when the connected lock bolt 64 is down in its locking position; and, in Fig. 8, said parts are shown in the positions they occupy after the cams 59 have been moved in one direction from their starting positions by the levers 56 to disengage the lock bolts 64 from the door parts 66.

Each door truck bar 13 supports a movable bracket 70 for vertical sliding movements. The brackets 70 have projections 71 and 72 engaging above and below the adjacent arms 67 and 69 so that upward and downward swinging movements of said arms 67 and 69 will move the brackets 70 upwardly and downwardly therewith. The brackets 70 are guided for vertical sliding movements by guides 73 secured to the respective truck bars 13 and are thereby held from longitudinal movements along the door truck members 13. This leaves the brackets 70 free to be moved vertically by the arms 67 and 69 when said arms are oscillated vertically by the cams 59. Each bracket 70 pivotally supports a latch arm 74 and a spring 75 for actuating said latch arm 74 upwardly into engagement with a rigid notched plate 76.

Figures 18, 19, 20, 21, 22, 23, 24, 25, 26:
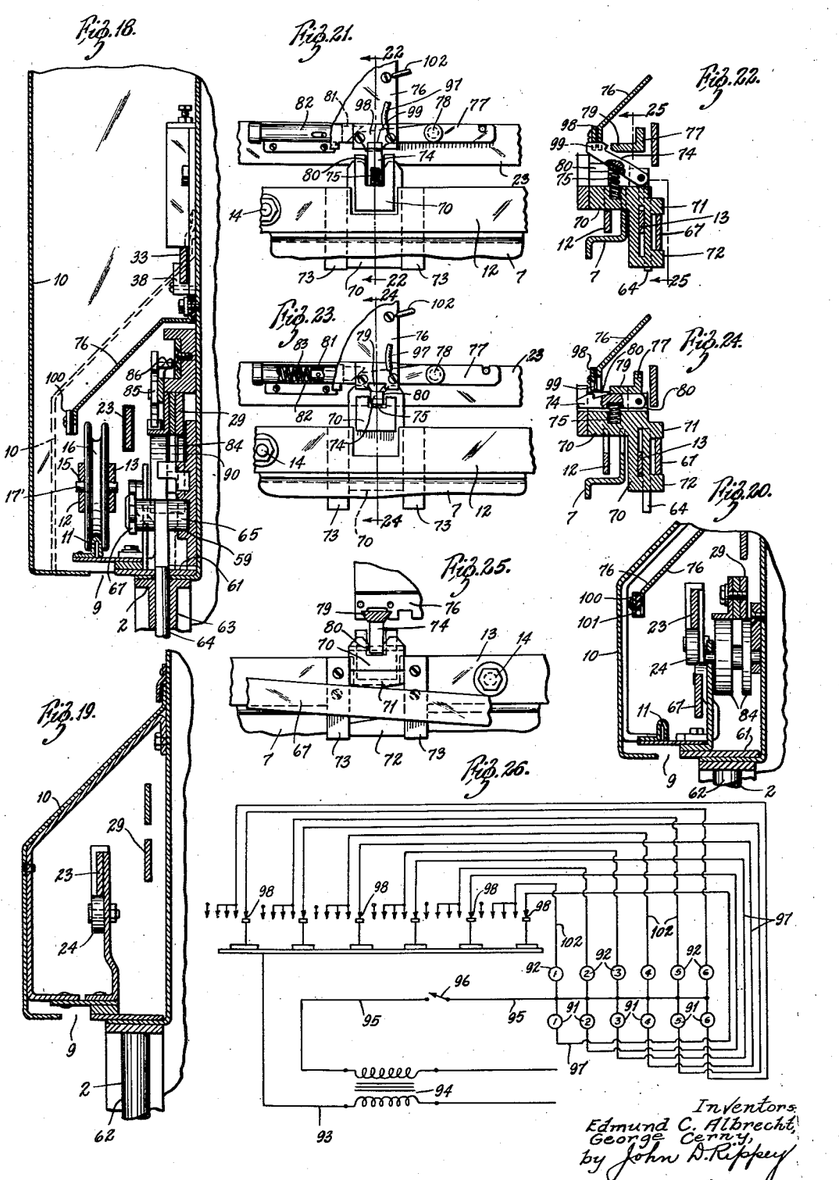
Fig. 18 is a vertical cross-sectional view approximately on the line 18—18 of Fig. 5.
Fig. 19 is a sectional view on the line 19—19 of Fig. 9.
Fig. 20 is a sectional view on the line 20—20 of Fig. 9.
Fig. 21 is a detail view of a portion of the locking means in closed position.
Fig. 22 is a sectional view on the line 22—22 of Fig. 21.
Fig. 23 is a view similar to Fig. 21, but showing the locking means released to permit the door to open.
Fig. 24 is a sectional view on the line 24—24 of Fig. 23.
Fig. 25 is a sectional view on the line 25—25 of Fig. 22.
Fig. 26 is a diagrammatic view of the wiring for the indicating mechanism.

In Fig. 22, the bracket 70 is shown in the position it occupies when the adjacent door is closed, and is locked in closed position by its lock bolt 64, which is down because the arms 67 and 69 are held in their downward positions (Fig. 7) by the cam 59. In Fig. 24, the parts are shown in the positions they occupy when the lock bolt 64 is up and out of engagement with the door. The arms 67 and 69 are moved to their upward positions when the lock bolt 64 is moved upwardly by the cam 59, which cam is moved by the lever 56, as described. This upward movement of each bracket 70 carries with it the latch 74 supported thereby and moves said latch from the position shown in Fig. 22 to the position shown in Fig. 24. This is to say that the latch 74 is moved from engagement with the rigid notched plate 76 as shown in Fig. 22 to a position out of engagement with said notched plate 76 as shown in Fig. 24, thereby unlocking the upper end of the door. The plate 76 is electrically insulated from the remaining cell structure.

Figure 6:
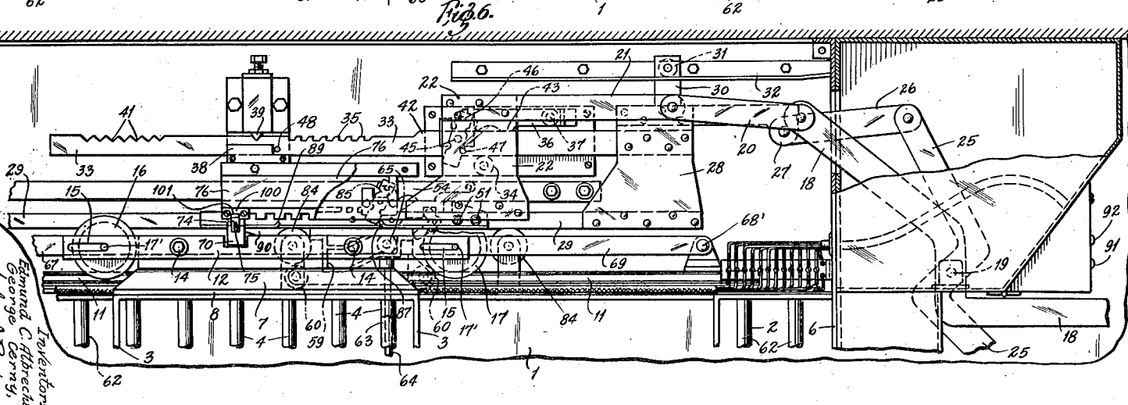
Fig. 6 is a similar view showing the same parts that are shown in Fig. 5 in the positions they occupy after the single door shown has been selected, unlocked and moved to and locked in open position.

For each door of the series, the longitudinally movable operating bar 23 supports a latch detent 77 on a pivot 78 (Figs. 21 and 23). The latch detent 77 is formed with an engaging portion 79 near its free end adapted to engage in a complementary notch 80 in the adjacent bracket 70 when said bracket 70 is moved upwardly to the position shown in Figs. 23 and 24 on release of lock bolt 64 (Fig. 6). A plunger 81 supported in a guide 82 attached to the operating bar 23 is actuated by a spring 83 to engage the free end of the detent 77 and yieldingly hold said detent in engagement with the bracket 70. The engaged ends of the detent 77 and plunger 81 are beveled as indicated (Figs. 21 and 23) so that the detent 77 may be moved upwardly out of engagement with the notch 80 by excessive pressure. This provides a yielding or releasable engagement between the detent 77 and the bracket 70.

Figure 12:
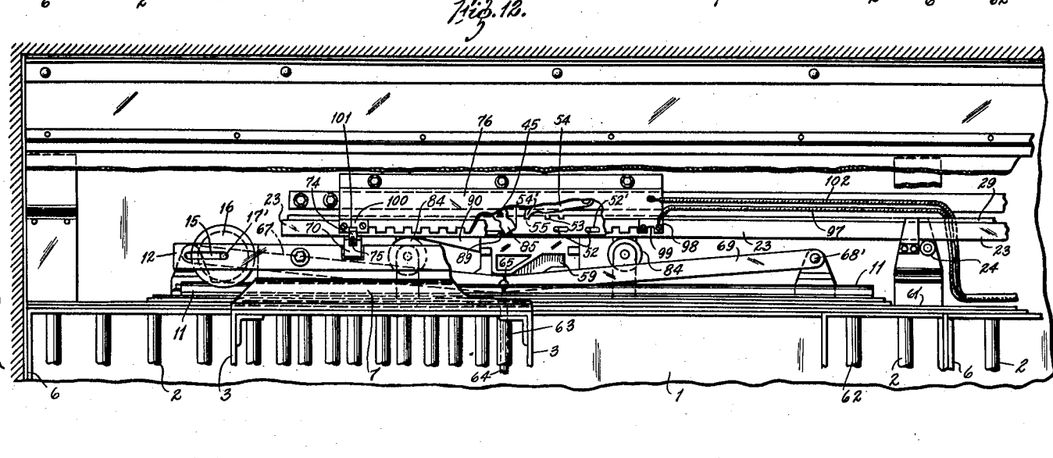
Figure 12A:
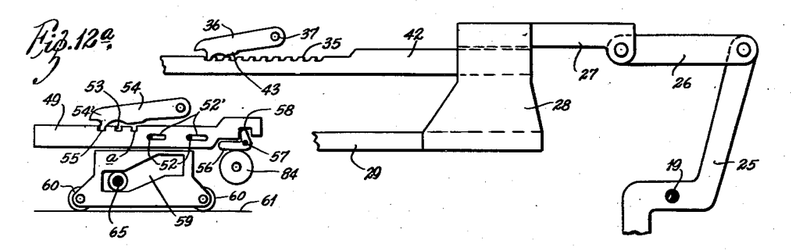
Fig. 12a is a view showing parts of the selecting and operating mechanism in their neutral or unoperated positions which they occupy when the doors are closed and fully locked.
Figure 12B:
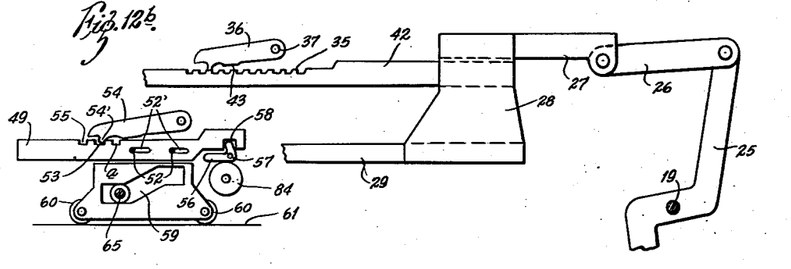
Fig. 12b is a similar view showing the same parts in the positions they occupy at the end of the first movement of the selecting lever 25.
Figure 12C:
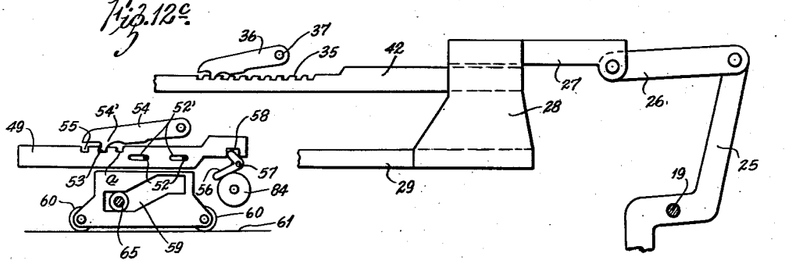
Fig. 12c is a similar view showing the same parts in the positions they occupy at the end of the second movement of the selecting lever 25.
Figure 12D:
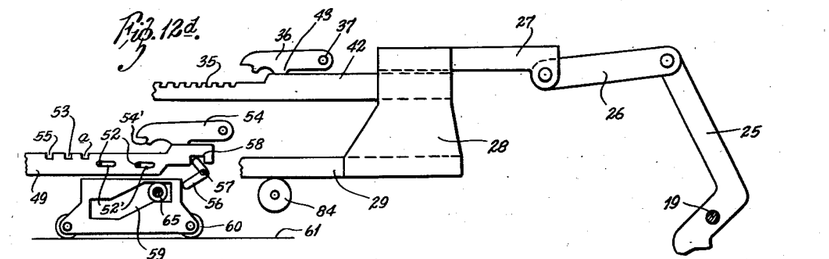
Fig. 12d is a view showing the positions of the same parts at the end of the full stroke of the selecting lever 25.

When the brackets 70, or any of them, are moved upwardly by upward movement of the arms 67 and 69 (Figs. 12 and 25), the latches 74 are disengaged from the rigid insulated plate 76 (Fig. 24), and the corresponding detents 77 maintain engagement with the brackets 70 (Fig. 23). Upward movement of any bracket 70 from the position shown in Figs. 21 and 22 to the position shown in Figs. 23 and 24 engages the latch 74 against the detent 77—79. Continued upward movement of the bracket 70 after the latch 74 has contacted against the detent 77—79 causes said detent to disengage said latch 74 from the rigid plate 76. This is because the spring 83 holding the plunger 81 prevents movement of the detent 77—79 and thereby disengages the latch 74 from the plate 76 while the bracket 70 moves to its uppermost position. The spring 83 is stronger than the spring 75 in order to hold the detent 77—79 and effect this disengagement of the latch 74 from the plate 76. Therefore, when the main operating lever 18 (Figs. 5 and 6) is swung outwardly from the position it occupies when all of the doors are closed and locked, the bar 23 is moved longitudinally and all of the unlocked doors are moved sidewise to open positions by engagement of the detents 77 with the raised brackets 70 of the unlocked doors. After the lever 18 has been operated to open any unlocked door or doors, or all of the doors of the series, as described, said lever 18 is left temporarily in its operated position and the index lever 25 is moved to its initial or unoperated position. This movement of the index lever 25 to its unoperated position also moves the bar 29 and all parts supported thereby to their initial or unoperated positions. This return movement of the bar 29 carries the levers 56 with it, and each of the levers 56 that had been operated to the cam engaging position shown in Fig. 8 contacts with the upper periphery of a roller 84 (Fig. 7), thereby quickly moving the corresponding plates 49 longitudinally to their unoperated positions in which all of the pawls 54 are engaged in the notches 55.

A latch support 85 for each pawl 54 is provided (Fig. 7). These latch supports are similar to the latch support 44, and each of said supports 85 is provided with a pin 86 for engagement under the free end of the corresponding pawl 54 after the pawls 54 have been disengaged from the notches 53, etc., in the bar plates 49. Each bar 50 is formed with a projection 87 (Figs. 7 and 8). The projections 87 engage the lower ends of the pawl supports 85 when the bar 29 is moved longitudinally to unlock the doors, and thereby turn the pawl supports 85 from the position shown in Fig. 7 to the position shown in Fig. 8 to engage the pins 86 under the free ends of the pawls 54 which had been raised by cams 88 out of engagement with the notches 53, etc. The cams 88 are formed on the bar plates 49 (Figs. 7 and 8a). When the main lever 25 is operated to lock the doors as described, the bar 29 and the parts supported thereby are moved longitudinally toward their starting positions, causing other projections 89 on the bars 50 to engage the lower ends of the pawl supports 85 and turn said pawl supports from the position shown in Fig. 8 to the position shown in Fig. 7, thereby disengaging the pins 86 from the pawls 54, permitting said pawls to be actuated downwardly by gravity or otherwise into engagement with the universal notches 55. When the pawls 54 are engaged with the universal notches 55, the lever 25 and its connected parts are in the neutral position so that the operating bar 29 will no longer perform its operating functions until re-indexed by manipulation of the lever 25.

During movement of any indexed or selected door toward open position, the latch detent 77 remains engaged with the bracket 70, thereby moving the door fully to its open position. After the door has reached its open position, the arms 67 and 69 are moved downwardly by movement of the cam 59 to its initial or starting position by a shoulder 90 as hereinafter described, thereby disengaging the bracket 70 from the detent 77 and leaving the latch 74 free to be moved upwardly by its spring 75 from the position shown in Fig. 24 to the position shown in Fig. 22. This engages the latch 74 in the last notch in the lower edge of the rigid insulated plate 76.

After any door or doors have been fully opened and are locked in their open positions by engagement of the latches 74 in the latch notches in the adjacent rigid insulated plates 76, the doors may be closed by again raising the lever 18 to its maximum upward position and then operating the lever 25 to raise the arms 67 and 69, thereby disengaging the latches 74 from the rigid plates 76 and reengaging the latch detents 77 with the brackets 70. After the latches 74 have been released and the detents 77 have been again engaged with the brackets 70, the lever 18 may be moved toward its starting or initial position, thereby moving any selected open door to its closed position. Thus, it is not essential to close all opened doors simultaneously, and any selected opened doors may be closed, leaving any other doors open at the option of the operator. After the doors are closed, the lock bolts 64 are again moved downwardly by lowering the index lever 25.

When any door is positively blocked or stopped during its movement toward open position or toward closed position, the lever 18 may be continued in its movement, thereby positively moving the longitudinal bar 23 in the direction in which it moves to open the doors, or in the direction in which it moves to close the doors. This positive movement of the longitudinal bar 23 positively moves the extension 79 of the detent 77 out of engagement with the bracket 70, thereby leaving the latch 74 free for movement to engage one of the notches in the lower edge of the rigid plate 76. The door thus blocked or stopped is thereby rigidly locked in the position in which it was blocked or stopped so that it cannot be moved manually in either direction until the blocking or stopping cause has been removed.

When a plurality of doors of the series are opened and less than all of the opened doors are positively blocked or stopped from movement to full closed positions, the doors that had not been blocked or stopped may be moved to their closed position by operation of the lever 18 and the bar 23 and locked in their closed positions by operation of the lever 25 and its connections. Then, the doors which had been blocked or stopped and had not been fully closed by the preceding operation may be indexed and conditioned for closing by operation of the lever 25 and its connections. Thereafter, when the causes blocking or stopping these doors from being closed are removed, the lever 18 may be operated to engage the detents 77 with the brackets 70 connected with the blocked or stopped doors, and said doors may be moved to their closed positions and locked in such positions by the described operations of the lever 25.

A shoulder 90 comprising one of the spacers between the bar 29 and each of the bars 50 projects downwardly in position to engage the corresponding cam 59 when the bar 29 is moved by the lever 25 toward its initial or starting position in order to lock the doors that had been opened. When the shoulders 90 engage the cams 59 that had been moved by the levers 56 to disengage the lock bars 64, said cams 59 are moved in the opposite direction toward their starting positions, thereby moving the lock bars 64 downwardly and also moving the adjacent or pivotally connected ends of the arms 67 and 69 downwardly from the position shown in Fig. 8 to the position shown in Fig. 7. This lowers the brackets 70 out of engagement with the detents 77 and permits the latches 74 to reengage the first notches in the respective plates 76 about the same time that the lock bolts 64 engage the parts 66 at the lower ends of the doors. Thus, both the upper ends and the lower ends of the closed doors are locked in the closed positions of said doors.

In Fig. 26, I have shown a series of signals 91 and another series of signals 92. There is one signal 91 and also one signal 92 for each door of the series. As shown, these signals are electric lamps, the signals 91 being of one color, such as green, and the signals 92 of a contrasting color, such as red. A wire 93 from a transformer 94 is connected with the frame of the series of doors, and constitutes a ground. The other wire 95 from the transformer has a switch 96 by which the circuit therethrough may be opened and closed. The wire 95 beyond the switch is connected with each lamp 91 and also with each lamp 92. For convenience, the first two lamps 91 and 92 at the left of the series are electrically controlled by the mechanism of the first door of the series; the next two lamps 91 and 92 are electrically controlled by the mechanism of the second door of the series; the third two lamps 91 and 92 from the left of the series of lamps are electrically controlled by the mechanism of the third door of the series of doors, and so on. As a consequence, a description of the operation of the first two lamps 91 and 92 of the series is sufficient to afford an understanding of the operation of the remaining lamps.

Figure 11:
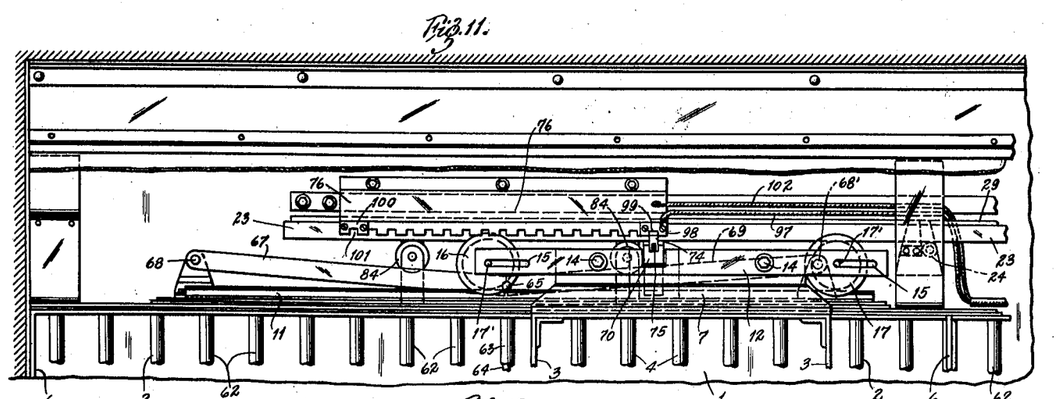
Figs. 11 and 12 are front elevations of the selecting and actuating mechanism for the last door of the series when said door is closed and open, respectively.

The wire 97 from the first lamp 91 leads to a contact element 98 (Figs. 11, 12 and 26) attached to the rigid insulated plate 76, and is insulated from the plate 76 and formed with a notch 99 at the first notch in the plate 76 in which the latch 74 engages when the first door is closed. Since the latch 74 is in electrical communication with the ground, namely with the frame of the series of the doors, a circuit is thus established lighting the first lamp 91 of the series, indicating that the first door is closed and is locked in its closed position by the latch 74 and the lock bar 64.

When the first door of the series, or any other door that is being opened, reaches its open position, the cam 59 for the respective doors that are being opened is moved far enough toward its starting position by operation of the lever 25 to lower the connected ends of the arms 67 and 69 and thereby lower the brackets 70 out of engagement with the latch detents 77, leaving the latches 74 free to be moved upwardly into engagement with insulated parts 100 on the rigid insulated plates 76. The parts 100 have notches 101 registering with the last notches in the respective plates 76, thereby permitting said latches 74 to lock the upper ends of the doors in their open positions. Since the parts 100 having notches 101 are insulated from the plate 76 and are not connected to the electrical system, the signal lights will not burn when the door is in the fully open position.

To initiate closing movement of the doors, it is only necessary to operate the lever 25 far enough to cause the levers 56 to move the cams 59 and thereby raise the connected ends of the arms 67 and 69. As already described, upward movements of the connected ends of the arms 67 and 69 raise the brackets 70 far enough to disengage the latches 74 from engagement in the notches 101 and to engage said brackets with the latch detents 77. After such operation of the lever 25, the lever 18 is operated to move the bar 23 and thereby the detents 77 in a direction to close the doors.

Should any door be blocked or stopped, the remaining doors which were not blocked or stopped will continue movement to closed positions, the latch detents 77 corresponding to the door that had been blocked or stopped moving out of engagement with the corresponding bracket 70. When the latch detent 77 of the blocked door becomes disengaged from its corresponding bracket 70, the latch 74 immediately is raised upward by the latch spring 75 so as to engage in one of the intermediate notches of the insulated plate 76. The plate 76 is connected by a wire 102 with the lamp 92 corresponding to the door that had been blocked or stopped. This will light the lamp corresponding to the door that had been blocked or stopped, thereby visually indicating to the operator the fact that one of the doors had been positively prevented from closing.

As shown (Fig. 13), the series of signals 91 and 92 are adjacent to the levers 18 and 25 so that they are plainly visible to the operator of said levers. After the obstruction has been removed from the door that had been stopped or blocked, the index lever 25 is again operated to a position to condition the mechanism for that door for operation. After the index lever has been operated to raise the arms 67 and 69 and thereby the bracket 70, the main operating lever 18 is operated to reengage the detent 77 with the bracket 70 of the blocked door, to thereby engage extension 79 in slot 80 and disengage latch 74 from plate 76, after which said door may be moved to its closed position and locked.

From the foregoing, it is apparent that this invention provides a mechanism for selectively indexing and unlocking and opening any doors in a row or series of doors, in combination with mechanism for moving said doors from their open toward their closed positions, means for operatively connecting the selected doors with said mechanism by which they are moved, means for disconnecting from said mechanism any doors that have been blocked and prevented from moving continuously toward their closed positions and for locking said blocked and disconnected doors in the positions in which they are stopped or blocked while the remaining doors are continuously moved to their closed positions and locked, and means for indicating the doors that had been blocked and disconnected from the operating mechanism and locked in their stopped or blocked positions. The invention also attains all of its objects and purposes efficiently and satisfactorily and is so encased or enclosed that it cannot be tampered with or disarranged by those within the rooms or cells, or those outside. The invention may be varied as widely as equivalent limits will permit without departure from the nature and principle thereof as defined by the appended claims.

We claim:

1. Mechanism for unlocking and moving selected doors of a series of doors from closed to open positions and for moving said doors to closed positions, comprising a locking mechanism for each door, a bar supported for longitudinal reciprocating movements adjacent to all of the doors of the series, a lever for reciprocating said bar longitudinally, a cam for moving each of said locking mechanisms to unlock the door controlled by said locking mechanism, elements supported by said bar for movements relative thereto, means supported by said bar and operated during an initial longitudinal movement of said bar to move said elements to positions to move said cams and thereby operate said locking mechanisms to unlock the corresponding selected doors during a subsequent longitudinal movement of said bar, devices for effecting relative movement between said means and said bar to move said elements relative to said bar to said positions, a main operating lever, and elements operated by said main lever and connected with said unlocked doors for moving said unlocked doors from their closed to their open positions and also for moving said doors from open to closed positions.

2. Mechanism for unlocking and moving selected unlocked doors of a series of doors from closed to open positions and for moving said doors to closed positions, comprising a locking mechanism for each door, a bar supported for longitudinal reciprocating movements transversely of all of the doors of the series, a lever for reciprocating said bar longitudinally, cams for moving said respective locking mechanisms to unlock the respective doors controlled by said locking mechanisms, elements supported by said bar for longitudinal movements therewith, means supported by said bar and operated during an initial longitudinal movement of said bar to move said elements to positions to move said cams and thereby operate said locking mechanisms to unlock the corresponding selected doors during a subsequent longitudinal movement of said bar, devices for effecting relative movement between said means and said bar to move said elements relative to said bar to said positions, a main operating lever, elements operated by said main lever and connected with said unlocked doors for moving said unlocked doors from their closed to their open positions and also for moving said doors from open to closed positions, and means for disconnecting any blocked or immovable door or doors from said last named elements and leaving the remaining doors that had been opened free for continuous movement to their closed positions by said elements and said main lever.

3. Mechanism for locking a series of doors in closed positions and also in open positions, comprising a pivoted arm above each of said doors, a vertically movable lock bolt connected with each of said arms and movable downwardly to positions to lock corresponding doors in closed positions and movable upwardly to unlock selected ones of said series of doors, a bracket movably carried by each door, a latch pivotally supported by each bracket for holding the upper end of the corresponding door in closed position and in open position and also in intermediate positions, means for moving said brackets by said arms, means for controlling said latches when they are moved as aforesaid, mechanism for selectively operating said lock bolts and said arms and thereby said latches to unlock selected doors of said series, and mechanism for moving said doors from closed positions to open positions and vice versa.

4. Mechanism for locking a series of doors in closed positions and also in open positions, comprising a pivoted arm above each of said doors, a vertically movable lock bolt connected with each of said arms and movable downwardly to positions to lock corresponding doors in closed positions and movable upwardly to unlock selected ones of said series of doors, a bracket movably carried by each door, a latch pivotally supported by each bracket for holding the upper end of the corresponding door in closed position and in open position and also in intermediate positions, means for moving said brackets by said arms, means for controlling said latches when they are moved as aforesaid, mechanism for selectively operating said lock bolts and said arms and thereby said latches to unlock selected doors of said series, mechanism connected with said doors for moving unlocked doors from closed to open positions and vice versa, and means for disconnecting any blocked or immovable door or doors from said mechanism and controlling said latches to lock said blocked or immovable door or doors in the positions in which they had become blocked or immovable and leaving the remaining doors that had been opened free for continuous movement to their closed positions.

5. In mechanism for moving a series of doors from closed to open position and for moving said opened doors to closed position having a bar supported for longitudinal reciprocating movements adjacent to all of the doors of the series for moving the doors, improved means for connecting the doors respectively to said bar including yielding detents respectively for the doors whereby any blocked or immovable door will be released while leaving the remaining doors that are connected as aforesaid free for further continuous movement by said bar, and engaging means respectively for locking said doors in the positions in which they had become blocked or immovable and disconnected from said connections, each of said engaging means including a latch restrained from locking engagement by one of said detents and released thereby for locking engagement when the detent yields to release the door from the bar as aforesaid.

6. In mechanism for moving a series of doors from closed to open position and for moving said opened doors to closed position having a bar supported for longitudinal reciprocating movements adjacent to all of the doors of the series for moving the doors, improved means for connecting the doors respectively to said bar including yielding detents respectively for the doors whereby any blocked or immovable door will be released while leaving the remaining doors that are connected as aforesaid free for further continuous movement by said bar, fixed plates respectively for each of the doors having spaced notches therein, and latches respectively for the doors restrained from engaging said notches by said detents and released thereby, when the doors are disconnected as aforesaid, to engage said notches and thereby lock the disconnected doors in the position in which they had become blocked or immovable.

7. In mechanism for selecting doors of a series of doors having a bar supported for longitudinal reciprocating movement and a shiftable element pertinent to a door to be selected, the improvement comprising a cam for shifting said element, an engaging member mounted on the bar for engaging and moving the cam and movable from neutral to engaging position, a plate mounted for limited reciprocating movement on and along said bar and positioned and arranged to move said engaging member from neutral to engaging position, said plate having a notch therein, and a pawl positioned and adapted to engage said notch, arranged and adapted whereby upon movement of the bar in one direction a selected distance the pawl will engage in the notch, then upon reverse movement of the bar the plate will be shifted to move the engaging member to engaging position and then upon further movement of the bar in its original direction the engaging member will engage the cam and shift said element.

8. In mechanism for selecting doors of a series of doors having a bar supported for longitudinal reciprocating movement and shiftable elements pertinent to the doors respectively to be selected, the improvement comprising sets of devices pertinent to each of said elements, each set including a cam for shifting said element, an engaging member mounted on the bar for engaging and moving the cam and movable from neutral to engaging position, a plate mounted for limited reciprocating movement on and along said bar and positioned and arranged to move said engaging member from neutral to engaging position, said plate having a notch therein, and a pawl positioned and adapted to engage said notch, the notches on the plates in the sets being differently positioned, arranged and adapted whereby the bar may be moved in one direction to any one of several selected positions each position causing a selected pawl only to engage in its notch, then upon reverse movement of the bar the selected pawl will shift its plate to move its engaging member to engaging position, and then upon further movement of the bar in its original direction the engaging member will engage the cam of the set of the selected pawl and shift its said element.

9. In mechanism for selecting doors of a series of doors having a bar supported for longitudinal reciprocating movement and shiftable elements pertinent to the doors respectively to be selected, the improvement comprising sets of devices pertinent to each of said elements, each set including a cam for shifting said element, an engaging member mounted on the bar for engaging and moving the cam and movable from neutral to engaging position, a plate mounted for limited reciprocating movement on and along said bar and positioned and arranged to move said engaging member from neutral to engaging position, said plate having a notch therein, and a pawl positioned and adapted to engage said notch, the notches on the plates in the sets being differently positioned, arranged and adapted whereby the bar may be moved in one direction to any one of several selected positions each position causing a selected pawl only to engage in its notch, then upon reverse movement of the bar the selected pawl will shift its plate to move its engaging member to engaging position, and then upon further movement of the bar in its original direction the engaging member will engage the cam of the set of the selected pawl and shift its said element, all of said plates having an additional notch similarly positioned one with the other whereby all of the sets may be set up by the same operation for shifting all of the said elements.

10. In mechanism for moving a series of doors from closed to open position and for moving said opened doors to closed position having a bar supported for longitudinal reciprocating movements adjacent to all of the doors of the series for moving the doors, improved means for connecting the doors respectively to said bar, each including a detent pivotally connected to the bar, a bracket connected with a door and having a notch with bevelled sides to receive said detent, and a spring pressed plunger constructed and arranged to yieldingly hold said detent in said notch and to release the detent under a predetermined stress between the bar and the door, whereby any blocked or immovable door will be released while leaving the remaining doors that are connected as aforesaid free for further continuous movement by said bar.

EDMUND C. ALBRECHT.
GEORGE CERNY.